(12) United States Patent
Wada

(10) Patent No.: US 7,711,940 B2
(45) Date of Patent: May 4, 2010

(54) CIRCUIT BLOCK AND CIRCUIT SYSTEM HAVING SKEW COMPENSATION, AND SKEW COMPENSATION METHOD

(75) Inventor: Yoshio Wada, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 11/641,040

(22) Filed: Dec. 19, 2006

(65) Prior Publication Data

US 2007/0143587 A1   Jun. 21, 2007

(30) Foreign Application Priority Data

Dec. 19, 2005   (JP) .............................. 2005-364635
Oct. 18, 2006   (KR) ...................... 10-2006-0101575

(51) Int. Cl.
*G06F 9/00* (2006.01)
*G06F 11/00* (2006.01)

(52) U.S. Cl. .................................. 713/1; 713/2; 714/23
(58) Field of Classification Search ........................ 713/1
See application file for complete search history.

(56) References Cited

U.S. PATENT DOCUMENTS

| 3,826,887 | A | * | 7/1974 | Pemberton | 219/497 |
| 6,407,597 | B1 | * | 6/2002 | Ishiwaki | 327/142 |
| 6,530,029 | B1 | * | 3/2003 | Metchev | 713/500 |
| 6,877,112 | B1 | * | 4/2005 | Iino et al. | 714/23 |
| 7,444,606 | B2 | * | 10/2008 | Kosugi et al. | 716/6 |

FOREIGN PATENT DOCUMENTS

| JP | 09288530 A | * | 11/1997 |
| JP | 2003265714 A | * | 9/2003 |
| KR | 10-1999-0041975 A | | 12/1999 |
| KR | 10-2001-0057336 A | | 7/2001 |

* cited by examiner

*Primary Examiner*—Suresh K Suryawanshi
(74) *Attorney, Agent, or Firm*—Sughrue Mion, PLLC

(57) ABSTRACT

A method and apparatus for compensating for a delay in the propagation of a plurality of signals via different signal paths, i.e., a skew compensation method, are provided. The apparatus includes a processing circuit which performs a data processing operation on input data, and a reset adjustment circuit which maintains a reset state of the processing circuit for a time period when a reset signal that initializes the processing circuit is received.

18 Claims, 7 Drawing Sheets

CIRCUIT BLOCK AND CIRCUIT SYSTEM HAVING SKEW COMPENSATION, AND SKEW COMPENSATION METHOD

CROSS-REFERENCE TO RELATED PATENT APPLICATION

This application claims priority from Japanese Patent Application No. 2005-364635, filed on Dec. 19, 2005, in the Japanese Intellectual Property Office, and Korean Patent Application No. 10-2006-0101575, filed on Oct. 18, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to the compensation of a delay (i.e., skew) in the propagation of signals via different signal paths, and more particularly, to a circuit for compensating for a delay in the propagation of multi-bit width data signals between large-scale integrated (LSI) circuits or between modules.

2. Description of the Related Art

As the operating speed of central processing units (CPUs), memories, and large-scale integrated (LSI) circuits increase, the demand for high-speed transmission of signals between LSI circuits or between modules has steadily grown. In order to transmit large amounts of data, methods of transmitting data using a number of multi-bit data transmission paths in parallel have been widely used.

However, in the case of transmitting data using a multi-bit data transmission system, a delay in the propagation of a plurality of signals, including a clock signal, a reset signal, and a data signal, via a plurality of signal paths, i.e., skew, is highly likely to occur if the signal paths have different printed circuit board (PCB) trace characteristics and different lengths and, thus, result in different data propagation speeds. Because of skew, multi-bit data transmitted at the same time by a transmitting party may be received by a receiving party at different times.

As the speed of data transmission increases, the proportion of data imbalance caused by skew to the period of data signals increases. Thus, a plurality of signals that need to be received at the same time may not be received at the same time. Therefore, it is necessary to develop deskew circuits that are capable of guaranteeing a stable reception of data by compensating for the skew.

An example of a skew compensation technique is disclosed in Japanese Patent Laid-Open Gazette No. 1998-040071 (hereinafter referred to as Cited Reference 1) entitled "Arithmetic Device and Method of Controlling Time Delay Therein."

In detail, Cited Reference 1 discloses an arithmetic device which includes two arithmetic circuits that perform an operation, at least two arithmetic termination circuits that determine whether the arithmetic circuits have completed their operations, and a synthesizer that receives an arithmetic termination signal obtained by each of the arithmetic termination circuits and determines whether all the arithmetic circuits have completed their operations.

The arithmetic device also includes a synchronization clock generation circuit which generates a clock signal that drives the arithmetic circuits to operate in synchronization with the arithmetic termination circuit. Therefore, after the arithmetic circuits terminate their operations, they sequentially perform their operations according to the clock signal, thereby preventing data deviation caused by skew.

According to Cited Reference 1, an input clock signal CLK and an input reset signal RESET are provided to each of first and second arithmetic circuits via a corresponding buffer circuit, as illustrated in FIG. 1. In this case, the input clock signal CLK and the input reset signal RESET must have the same phase, and buffer circuits with high driving power are needed.

However, the invention disclosed in Cited Reference 1 may result in an increase in the power consumption of buffer circuits that output a clock signal and a reset signal, especially when the aforementioned synchronization design is applied to LSI circuits. In addition, in some cases, buffer circuits which supply a clock signal and a reset signal consume more power than the arithmetic circuits that perform data processing operations.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention provides a circuit block and circuit system having a skew compensation function, and a skew compensation method which can enable the synchronization design of a circuit system in units of circuit blocks that respectively embody a plurality of data processing functions of the circuit system, and can prevent the performance of the circuit system from deteriorating by precisely compensating for skew between the circuit blocks while consuming less power.

According to an aspect of the present invention, there is provided a circuit block. The circuit block includes a logic circuit which performs a data processing operation on input data, and a reset adjustment circuit which maintains a reset state of the logic circuit for a time period when a reset signal that initializes the logic circuit is received.

According to another aspect of the present invention, there is provided a circuit system. The circuit system includes a plurality of circuit blocks and a reset circuit which outputs a reset signal to each of the circuit blocks, wherein each of the circuit blocks includes a logic circuit which performs a data processing operation on input data, and a reset adjustment circuit which maintains a reset state of the logic circuit for a time period when a reset signal that initializes the logic circuit is received.

According to another aspect of the present invention, there is provided a skew compensation method. The skew compensation method includes putting a logic circuit which performs a data operation into a reset state when a reset signal is received, receiving a plurality of data signals, and canceling the reset state of the logic circuit a time period after the reception of the reset signal.

Another aspect of an exemplary embodiment of the present invention includes the division of a circuit system that is formed on a circuit board or inside a large-scale integrated (LSI) circuit into a number of circuit blocks, which are functional units respectively realizing arithmetic and logic processing operations performed by the circuit system, wherein, even though each of the circuit blocks operates in synchronization with an internal clock signal, there is no need to transmit signals between the circuit blocks in synchronization with a clock signal. The technical concept of the present invention also includes the adjustment of delays between the circuit blocks by adjusting the duration of a reset state of each of the circuit blocks according to a delay in a data signal input thereto.

BRIEF DESCRIPTION OF THE DRAWINGS

The above and other features aspects of the present invention will become more apparent by describing in detail exemplary embodiments thereof with reference to the attached drawings in which.

DETAILED DESCRIPTION OF THE INVENTION

Figure 1:
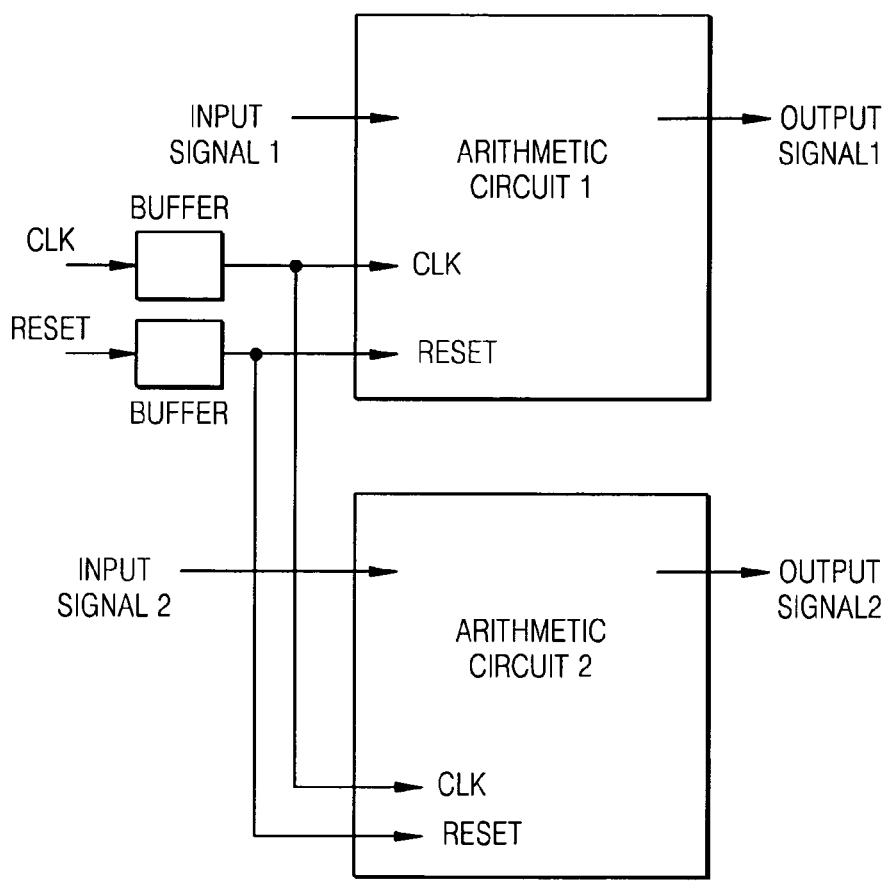
FIG. 1 is a block diagram of a circuit system in the related art.

Reference will now be made in detail to the exemplary embodiments of the present invention, examples of which are illustrated in the accompanying drawings, wherein like reference numerals refer to like elements throughout. The exemplary embodiments are described below in order to explain the present invention while referring to the figures.

Figure 2:
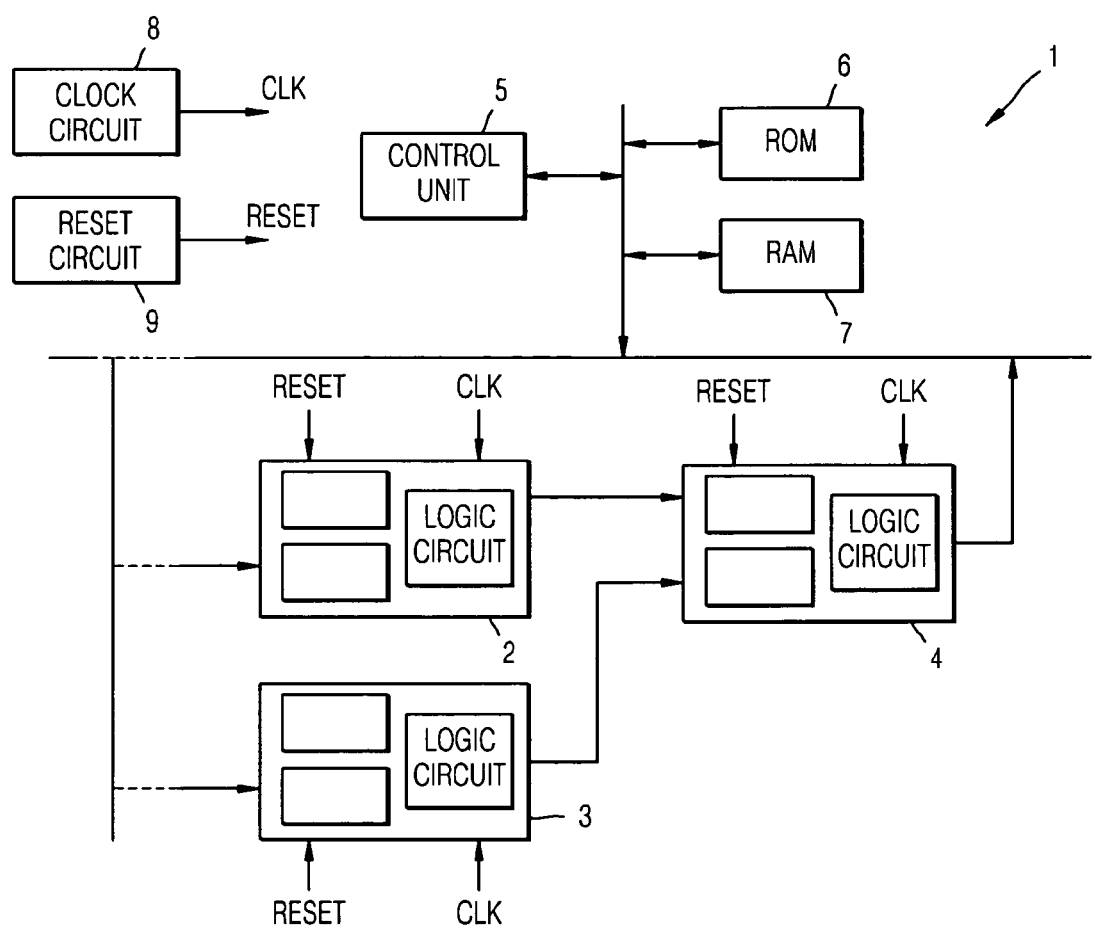
FIG. 2 is a block diagram of a circuit system according to an exemplary embodiment of the present invention.

FIG. 2 is a block diagram of a circuit system 1 according to an exemplary embodiment of the present invention. Referring to FIG. 2, the circuit system 1 includes a plurality of circuit blocks 2, 3, and 4, a control unit 5, a read-only memory (ROM) 6, a random access memory (RAM) 7, a clock circuit 8, and a reset circuit 9. Other circuit blocks (not shown) may be provided ahead of the circuit blocks 2 and 3.

The circuit blocks 2, 3, and 4 are functional units that respectively realize data processing functions performed by a circuit system that is formed on a circuit board or inside a large-scale integrated (LSI) circuit. Examples of the data processing functions include: arithmetic operations such as addition, subtraction, multiplication; butterfly operations; and logic processing operations such as comparison and determination; and further, may include various processes that are performed on data in synchronization with a clock signal upon the receipt of the data such as clock-based synchronization processing, count processing, and sequential processing.

The clock circuit 8 provides the control unit 5 and the circuit blocks 2, 3, and 4 with a clock signal which is generated in the circuit system 1 or is provided externally.

The reset circuit 9 provides the circuit blocks 2, 3, and 4 with a reset signal which is generated in the circuit system 1 or is provided externally. The reset circuit 9 may provide the reset signal to the control unit 5.

The control unit 5 outputs control data stored in the ROM 6 or control data stored in the RAM 7 to each of the circuit blocks 2, 3, and 4 according to a program that is stored in the ROM 6.

Figure 3:
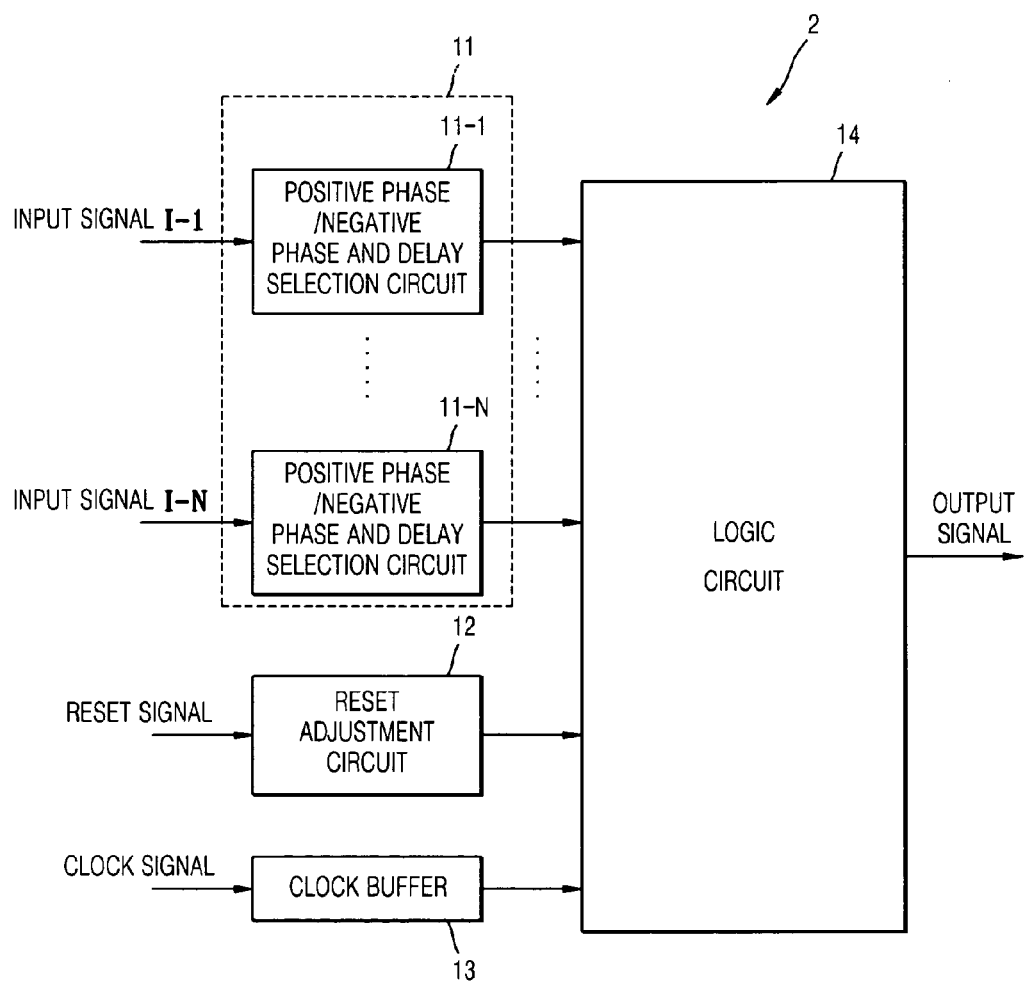
FIG. 3 is a block diagram of a circuit block according to an exemplary embodiment of the present invention.

FIG. 3 is a block diagram of the circuit block 2 illustrated in FIG. 2. The circuit blocks 3 and 4 have the same structure as the circuit block 2.

Referring to FIG. 3, the circuit block 2 includes an input timing adjustment circuit 11, a reset adjustment circuit 12, a clock buffer 13, and a logic circuit 14.

The logic circuit 14 performs a data processing operation on each of a plurality of input signals I-1 through I-N. Examples of the data processing operation may include: arithmetic operations such as addition, subtraction, multiplication; butterfly operations; and logic processing operations such as comparison and determination. The input signals I-1 through I-N are data signals that are input from a plurality of circuit blocks that precede the circuit block 2.

The input timing adjustment circuit 11 adjusts the input timing of the input signals I-1 through I-N being input to the logic circuit 14. The input timing adjustment circuit 11 comprises a plurality of positive phase/negative phase and delay selection circuits 11-1 through 11-N.

Delays among the input signals I-1 through I-N are likely to cause mismatches in the timing of the input signals I-1 through I-N being input to the logic circuit 14. The positive phase/negative phase and delay selection circuits 11-1 through 11-N respectively adjust delays among the input signals I-1 through I-N so that the times when the input signals I-1 through I-N are respectively input to the logic circuit 14 can coincide with one another. In other words, the positive phase/negative phase and delay selection circuits 11-1 through 11-N respectively delay the input signals I-1 through I-N so that the times when the input signals I-1 through I-N are respectively input to the logic circuit 14 can coincide with the time when the latest input signal of the input signals I-1 through I-N is input to the logic circuit 14 or may fall within a short time of when the latest input signal of the input signals I-1 through I-N is input to the logic circuit 14.

When a reset signal that initializes the logic circuit 14 is input, the reset adjustment circuit 12 maintains a reset state of the logic circuit 14 for an amount of time. In detail, when a reset signal is input, the reset adjustment circuit 12 supplies the logic circuit 14 with an adjusted rest signal in response to the reset signal so that the logic circuit 14 can be put into a reset state. Then, the reset adjustment circuit 12 counts the number of clocks of a clock signal, and maintains the reset state of the logic circuit 14 until a count value obtained by the counting reaches a predefined value. When the reset adjustment circuit 12 determines that the count value has reached the predefined value, the reset adjustment circuit 12 stops supplying the logic circuit 14 with the adjusted reset signal so that the logic circuit 14 can perform an operation.

The clock buffer 13 normalizes the waveform of a clock signal output by the clock circuit 8, and outputs the result of the normalization to the positive phase/negative phase and delay selection circuits 11-1 through 11-N, the reset adjustment circuit 12, and the logic circuit 14 as an internal clock signal. Then, the positive phase/negative phase and delay selection circuits 11-1 through 11-N, the reset adjustment circuit 12, and the logic circuit 14 can perform their operations in the circuit block 2 in synchronization with the internal clock signal.

Figure 4:
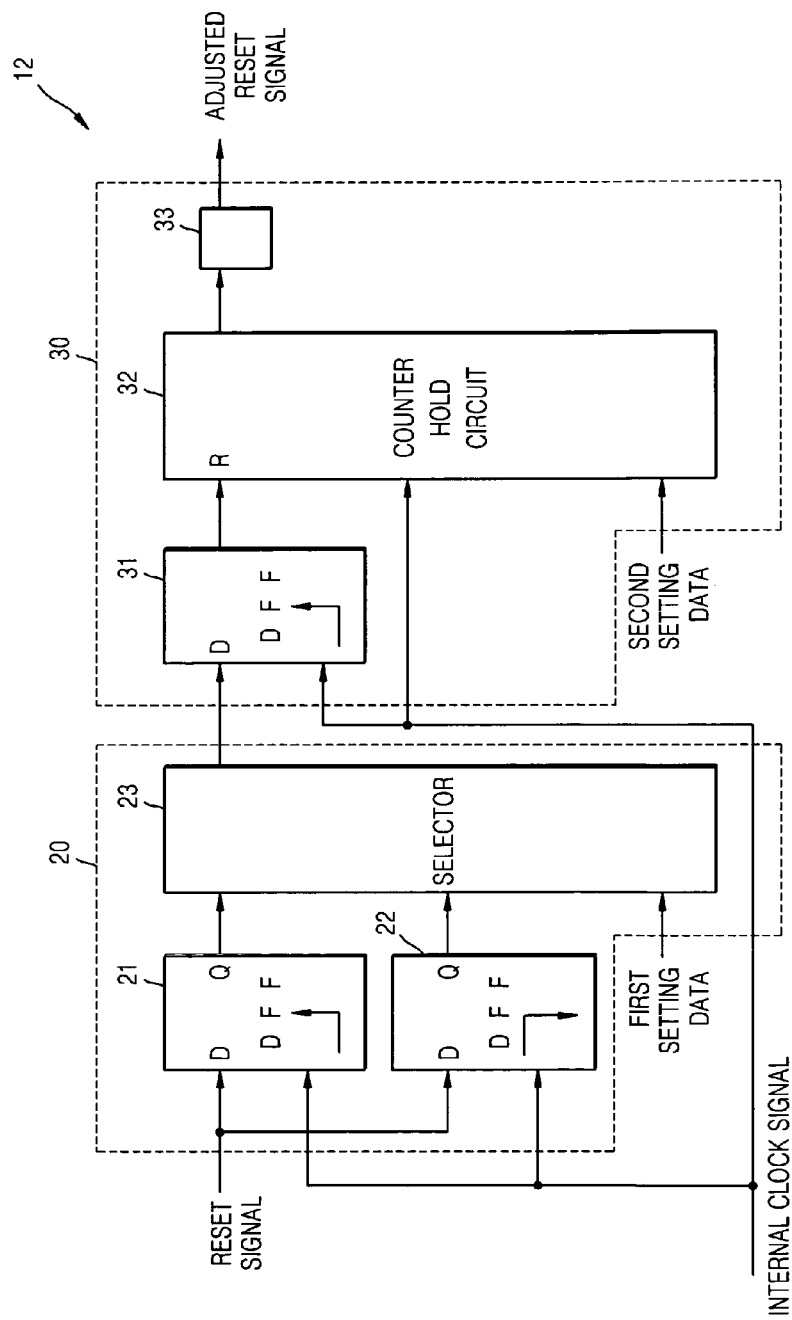
FIG. 4 is a block diagram of a reset adjustment circuit according to an exemplary embodiment of the present invention.

FIG. 4 is a block diagram of the reset adjustment circuit 12 illustrated in FIG. 3. Referring to FIG. 4, the reset adjustment circuit 12 includes a positive phase/negative phase selection circuit 20 and a delay selection circuit 30.

The positive phase/negative phase selection circuit 20 includes delay-flipflops (D-flipflops) 21 and 22, and a selector 23. The D-flipflop 21 maintains a reset signal at a rising edge of an internal clock signal and outputs the result of the maintenance as a positive reset signal. The D-flipflop 22 maintains a reset signal at a falling edge of the internal clock and outputs the result of the maintenance as a negative reset signal.

The selector 23 chooses one of the positive and negative reset signals that are respectively output by the D-flipflops 21 and 22 according to first setting data, and outputs the chosen reset signal as an internal reset signal.

Even if a reset signal is output by the reset circuit 9 in synchronization with a clock signal, a reset signal input to the circuit block 2 may not be synchronized with the clock signal because of a delay in the reset signal. The positive phase/negative phase selection circuit 20 chooses whichever of the rising edge and the falling edge of the internal clock signal can enable a stable reception of a reset signal and uses the chosen edge of the internal clock signal, thereby guaranteeing the receipt of the reset signal. The first setting data is determined in advance based on measurement results obtained when the circuit block 2 is connected to other circuit blocks. The first setting data may be stored in the ROM 6.

The delay selection circuit 30 includes a D-flipflop 31, a counter hold circuit 32, and a reset buffer 33.

The D-flipflop 31 receives whichever of the positive reset signal and the negative reset signal is chosen as the internal reset signal by the selector 23 at the rising edge of the internal clock signal, and maintains the received reset signal for an amount of time, and then outputs the received reset signal.

When the internal reset signal is input, the counter hold circuit 32 resets a counter installed therein to a value of 0. Then, the counter hold circuit 32 starts to count the number of clocks of the internal clock signal and, at the same time, outputs an adjusted reset signal to the logic circuit 14 via the reset buffer 33 so that the logic circuit 14 is put in a reset state.

Also, if a count value of the counter in the counter hold circuit 32 matches a count value indicated by second setting data, then the counter hold circuit 32 may stop the counter therein from performing a count operation any further so that the corresponding counter can be put in a hold state. In addition, the counter hold circuit 32 stop outputting the adjusted rest signal. Accordingly, the operating state of the logic circuit 14 is changed from a reset state to an operable state so that the logic circuit 14 begins to perform an operation in synchronization with the internal clock signal. The delay of the reset signal will hereinafter be interpreted as increasing the time taken to stop outputting the adjusted reset signal after inputting the reset signal to each circuit block, i.e., the duration of a reset state of each circuit block.

The second setting data is set to a count value corresponding to a period of time between when a reset signal transmitted by the reset circuit 9 arrives at the circuit block 2 and when input data transmitted by a circuit block that precedes the circuit block 2 arrives at the circuit block 2. The period of time can be determined by measuring a delay between a reset signal and input data when the circuit block 2 is connected to the preceding circuit block.

The counter hold circuit 32 can variably determine when to initiate data processing in the circuit block 2 according to the second setting data. Thus, it is possible to adjust a delay between the time when a reset signal is input and the time when data processing is initiated, according to the timing of an input signal being transmitted from a circuit block that precedes the circuit block 2 to the circuit block 2. In addition, according to the present exemplary embodiment, a time delay can be adjusted by counting a clock signal with the aid of a counter. Thus, it is possible to compensate longer time delays than in the prior art without the need to increase the size of entire circuitry.

The first setting data or the second setting data, which is received from an external device, may be stored in the RAM 7. Then, the first setting data or the second data can be precisely adjusted according to the result of measuring delays between a plurality of circuit blocks, thereby making it possible to precisely adjust the timing of a plurality of input signals being input to a circuit block according to an actual time delay between the input signals.

Figure 5:
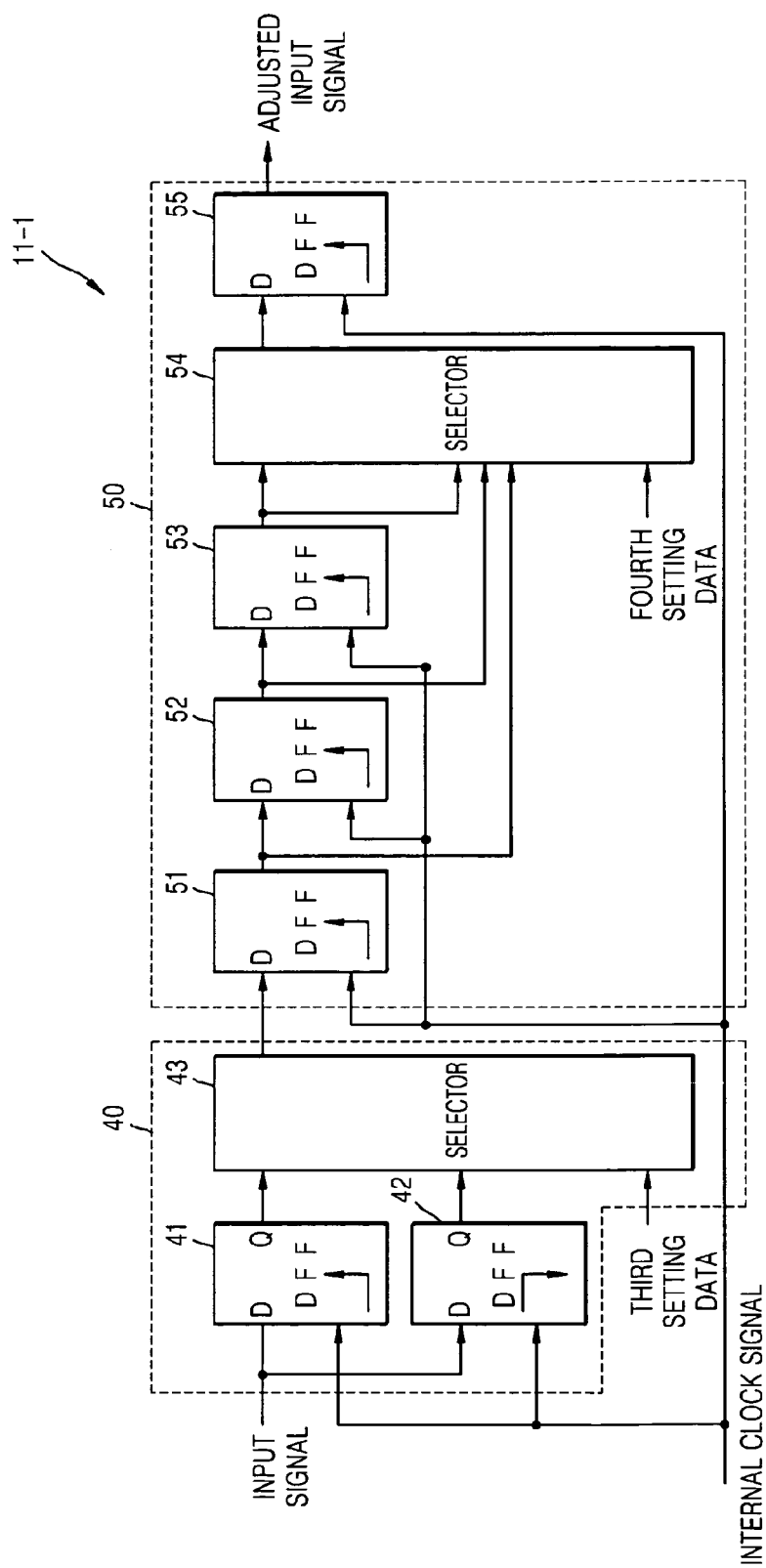
FIG. 5 is a block diagram of a positive phase/negative phase and delay selection circuit according to an exemplary embodiment of the present invention.

FIG. 5 is a block diagram of the positive phase/negative phase and delay selection circuit 11-1 illustrated in FIG. 3, according to an exemplary embodiment of the present invention. The structure and operation of only one of the positive phase/negative phase and delay selection circuits 11-1 through 11-N is illustrated in FIG. 3, particularly, the structure and operation of the positive phase/negative phase and delay selection circuit 11-1, will hereinafter be described in detail. However, the following description of the positive phase/negative phase and delay selection circuit 11-1 directly applies to the positive phase/negative phase and delay selection circuits 11-2 through 11-N.

Referring to FIG. 5, the positive phase/negative phase and delay selection circuit 11-1 includes a positive phase/negative phase selection circuit 40 and a delay selection circuit 50. The positive phase/negative phase selection circuit 40 includes D-flipflops 41 and 42 and a selector 43. The D-flipflop 41 maintains an input signal at a rising edge of an internal clock signal and outputs the result of the maintenance as a positive input signal. The D-flipflop 42 maintains an input signal at a falling edge of the internal clock signal, and outputs the result of the maintenance as a negative input signal.

The selector 43 chooses one of the positive and negative input signals respectively output by the D-flipflops 41 and 42 according to third setting data, and outputs the chosen input signal as an adjusted input signal.

The delay selection circuit 50 includes D-flipflops 51, 52, 53, and 55 and a selector 54.

The D-flipflops 51, 52, and 53 constitute a shift register. The D-flipflops 51, 52, and 53 respectively output an adjusted input signal at an interval of one period of the internal clock signal from one another. In other words, the D-flipflop 52 delays an adjusted input signal output by the D-flipflop 51 by one period of the internal clock signal, and outputs an adjusted input signal obtained by the delaying. Likewise, the D-flipflop 53 delays the adjusted input signal output by the D-flipflop 52 by one period of the internal clock signal, and outputs an adjusted input signal obtained by the delaying. According to the present exemplary embodiment, a shift register is comprised of three D-flipflops. However, the number of D-flipflops that are needed to form a shift register can be altered according to the number of steps needed for delay adjustment.

The selector 54 chooses one of the adjusted input signals output by the D-flipflops 51, 52, and 53 according to fourth setting data, and outputs the chosen signal as a new adjusted input signal. The fourth setting data indicates a numerical value for determining a delay time of the input signal.

The D-flipflop 55 receives the adjusted input signal output by the selector 54 at the rising edge of the internal clock signal, maintains the received adjusted input signal, and outputs the result of the maintenance.

According to the present exemplary embodiment, the positive phase/negative phase and delay selection circuit 11-1 illustrated in FIG. 5 is installed in a circuit block for each input signal that is input to the circuit block. Thus, even if delays between a plurality of input signals are irregular, the timing of the input signals can be properly adjusted so that the times when the input signals are respectively input to the logic circuit 14 can coincide with the timing of the latest input signal of the plurality of input signals being input to the logic circuit 14. For this, delays among a plurality of input signals can be adjusted according to which of the output signals of the D-flipflops 51, 52, 53, and 55 in the delay selection circuit 50 is to be determined as an adjusted input signal.

The third setting data or the fourth setting data is received from an external device. The third setting data or the fourth setting data, like the first setting data or the second setting data, may be stored in the RAM 7. Then, the third setting data or the fourth setting data can be readily adjusted according to the result of measuring delays between a plurality of circuit blocks, thereby making it possible to precisely adjust the timing of a plurality of input signals being input to a circuit block according to an actual time delay between the input signals.

Figure 6:
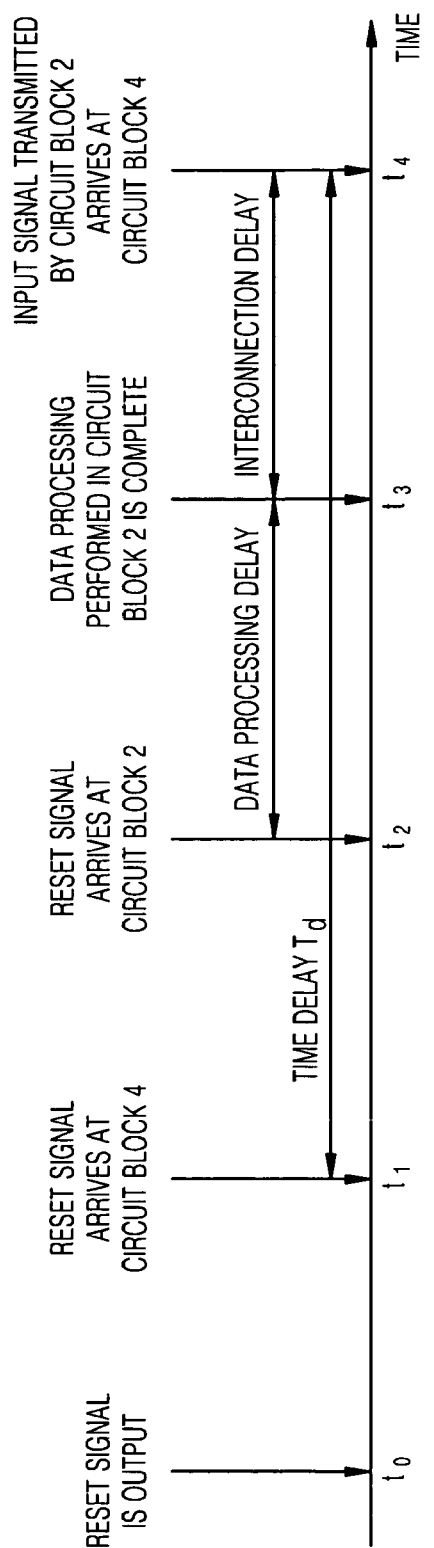
FIG. 6 is a timing diagram for explaining a plurality of operations performed in each circuit block after a reset circuit outputs a reset signal.

The operation of the circuit system illustrated in FIG. 2 will hereinafter be described in detail with reference to FIGS. 2 through 6. FIG. 6 is a timing diagram for explaining a plurality of operations performed in each circuit block after the reset circuit 9 outputs a reset circuit.

When the circuit system 1 begins to operate, the control unit 5 reads from the ROM 6 or the RAM 6 first through fourth setting data corresponding to each circuit block in the circuit system 1, and inputs the first through fourth setting data to a plurality of positive phase/negative phase and delay selection circuits 11-1 through 11-N and a reset adjustment circuit 12 in a corresponding circuit block. Then, the control unit 5 determines when to receive an input signal and a reset signal, i.e., whether the input signal and the reset signal are to be received at a rising edge or a falling edge of an internal clock signal. In addition, the control unit 5 determines the amount by which the input signal and the reset signal are to be delayed.

Here, the third and fourth setting data may vary from one positive phase/negative phase and delay selection circuit to another, and may be stored in the ROM 6 or the RAM 7. Also, the amount by which the input signal and the reset signal are to be delayed may vary from one positive phase/negative phase and delay selection circuit to another.

For example, with reference to FIG. 6, assume that a reset signal output by the reset circuit 9 arrives at the circuit blocks 2 and 3 at a time t2 and arrives at the circuit block 4 at a time t1 because of a delay in the transmission of the reset signal via signal lines and that the circuit block 2 terminates data processing at a time t3 and then outputs a signal obtained by the data processing to the circuit block 4. The time period between the time t2 and the time t3 is the time taken by the circuit block 2 to complete data processing, i.e., a time delay in data processing performed by the circuit block 2. A time delay in the transmission of the output of the circuit block 2 via an interconnection line that connects an output terminal of the circuit block 2 and an input terminal of the circuit block 4 can be referred to as an interconnection delay.

Each circuit block generates an internal clock signal based on a clock signal output by the clock circuit 8, and operates in synchronization with the internal clock signal. The timing of the clock signal output by the clock circuit 8, like the timing of the reset signal output by the reset circuit 9, may become irregular due to an interconnection delay that occurs in a signal line connecting the clock circuit 8 and each circuit block.

An arithmetic cell of a circuit block operates in synchronization with a reset signal. Thus, a circuit block may be initialized by a reset signal upon the receipt of the output of a previous circuit block. In this regard, the circuit block 4 must begin to perform its operation at a time t4 when the output of the circuit block 2 is received as an input signal. However, referring to FIG. 6, the circuit block 4 receives a reset signal earlier than the circuit block 2.

Therefore, the control unit 5 reads first through fourth setting data from the ROM 6 or the RAM 7 when the circuit system 1 begins to operate, and writes the second setting data corresponding to the reset adjustment circuit 12 of the circuit block 4. Assuming that the time period between the time t1 and the time t4 is a time delay Td, the second setting data may be a count value corresponding to the time delay Td (i.e., Td≈internal clock period×number of clocks).

In other words, the time delay Td is the time taken by the circuit block 4 to receive an input signal after receiving a reset signal. Also, the time delay Td is equal to the total of the difference between the time when the reset signal is input to the circuit block 2 and the time when the reset signal is input to the circuit block 4, a delay in data processing performed by the circuit block 2, and an interconnection delay that occurs between the output terminal of the circuit block 2 and the input terminal of the circuit block 4.

When a time delay in data processing performed by the circuit block 2 differs from a time delay in data processing performed by the circuit block 3, a reset signal is delayed for the circuit block 4 according to the timing of an input signal transmitted by whichever of the circuit blocks 2 and 3 results in a longer data processing delay. Then, the timing of an input signal transmitted by whichever of the circuit blocks 2 and 3 results in a shorter data processing delay is appropriately adjusted so that the time when the input signal transmitted by the circuit block 2 is input to the circuit block 4 can coincide with the time when the input signal transmitted by the circuit block 3 is input to the circuit block 4.

Figure 7:
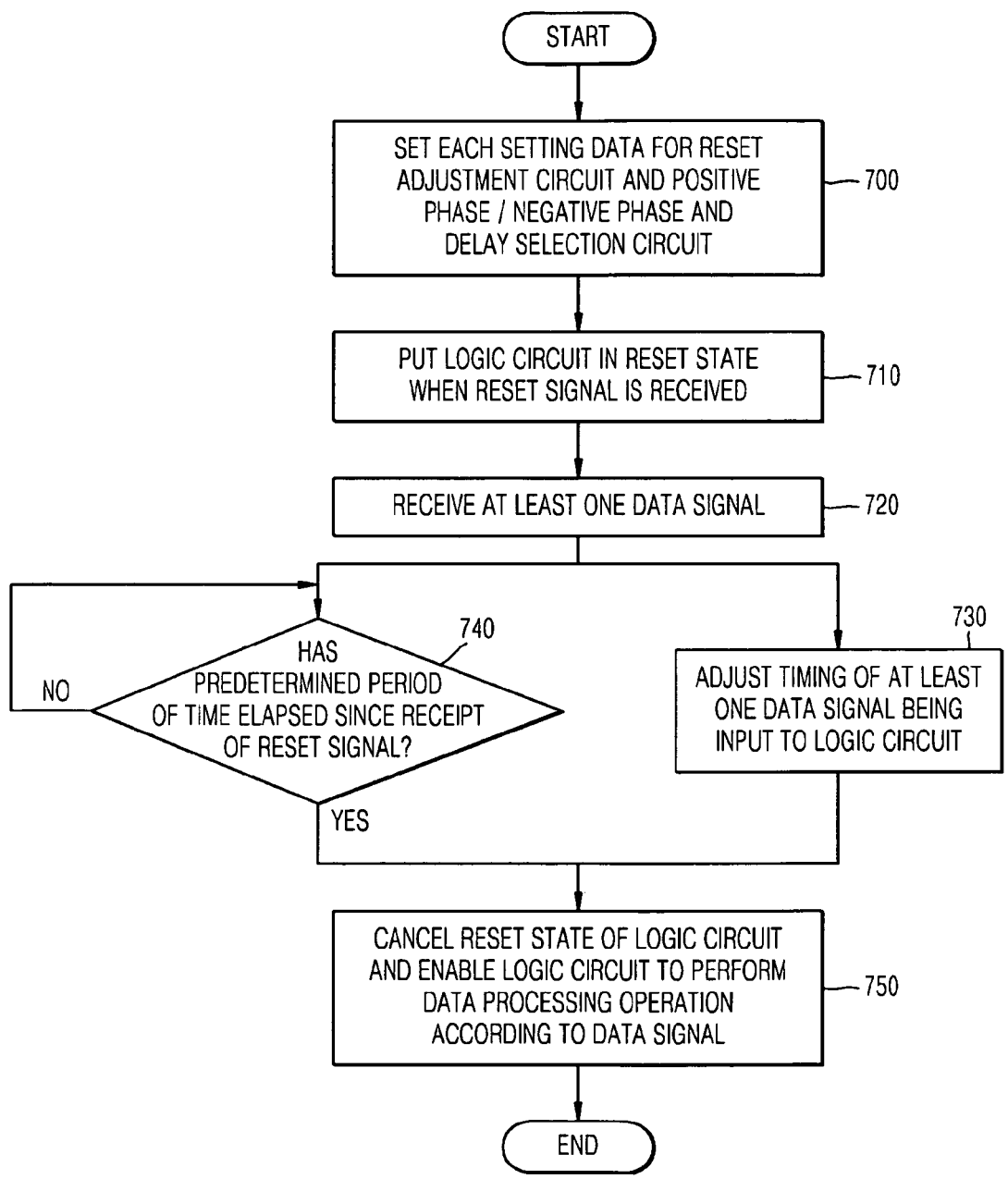
FIG. 7 is a flowchart illustrating a skew compensation method according to an exemplary embodiment of the present invention.

FIG. 7 is a flowchart illustrating a skew compensation method according to an exemplary embodiment of the present invention. The skew compensation method illustrated in FIG. 7 comprises a plurality of operations performed by the circuit block 2 illustrated in FIG. 3. Thus, the description of the circuit block 2 presented above directly applies to the skew compensation method illustrated in FIG. 7.

Referring to FIG. 7, in operation 700, the circuit block 2 sets a plurality of setting data corresponding to the reset adjustment circuit 12 and each of the positive phase/negative phase and delay selection circuits 11-1 through 11-N, i.e., setting data regarding the delay of a reset signal and setting data regarding the delay of an input signal.

In operation 710, the circuit block 2 puts the logic circuit 14 in a reset state upon the receipt of the reset signal.

In operation 720, the circuit block 2 receives a plurality of data signals from respective corresponding circuit blocks that precede the circuit block 2.

In operation 730, the circuit block 2 adjusts the timing of the data signals. In other words, the circuit block 2 delays the data signals by different amounts according to the setting data regarding the delay of an input signal so that the times when the data signals are respectively input to the logic circuit 14 can coincide with one another.

In operation 740, the circuit block 2 determines whether a predetermined amount of time has elapsed since the receipt of the reset signal. If it is determined in operation 740 that the predetermined amount of time has elapsed since the receipt of the reset signal, then the skew compensation method proceeds to operation 750.

In operation 750, the circuit block 2 cancels the reset state of the logic circuit 14 so that the logic circuit 14 can perform data processing according to the data signals.

According to the exemplary embodiments of the present invention, once a logic circuit in each circuit block is put in a reset state in response to a reset signal applied to a corresponding circuit block, the reset state of the logic circuit may be maintained for a predetermined period of time so that the logic circuit may be prevented from performing its operations until a necessary input signal is input thereto. Accordingly, it is possible to properly handle signal delays in each circuit block of a circuit system without the aid of a complicated synchronization circuit.

In addition, according to the exemplary embodiments of the present invention, a circuit system may be designed so that a plurality of circuit blocks of the circuit system can be in synchronization with one another, and skew between the circuit blocks is compensated for using a simple circuit. Accordingly, it is possible to perform skew compensation with low power consumption. Moreover, according to the exemplary embodiments present invention, the timing of data signals for an entire circuit system may be controlled by controlling the timing of initiation of the operation of each circuit block in the circuit system. Accordingly, it is possible to easily compensate for skew and prevent deterioration of the performance of a circuit system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A circuit block comprising:
a processing circuit which performs a data processing operation on input data; and
a reset adjustment circuit which maintains a reset state of the processing circuit for a time period when a reset signal that initializes the processing circuit is received,
wherein the reset adjustment circuit comprises a positive phase/negative phase selection circuit which determines whether the reset signal is to be received at a rising edge or a falling edge of a clock signal that is used to perform synchronization processing in the circuit block.

2. The circuit block of claim 1, wherein the reset adjustment circuit sets the time period based on a time difference between when the reset signal is received and when the input data is received from a previous circuit block that precedes the circuit block.

3. The circuit block of claim 1, wherein the reset adjustment circuit resets the time period.

4. The circuit block of claim 1, wherein the reset adjustment circuit maintains the reset state of the processing circuit until a count value obtained by counting a clock signal that is used to perform synchronization processing in the circuit block reaches a set value.

5. The circuit block of claim 1, further comprising an input timing adjustment circuit which adjusts an input timing of a plurality of data signals when the data signals are input to the processing circuit.

6. The circuit block of claim 5, wherein the input timing adjustment circuit comprises a positive phase/negative phase selection circuit which determines whether the data signals are to be received at a rising edge or a falling edge of a clock signal that is used to perform synchronization processing in the circuit block.

7. The circuit block of claim 5, wherein the input timing adjustment circuit comprises:
a shift register which comprises a plurality of flipilops and receives the data signals; and
a selector which chooses a signal output by one of the flipilops and outputs the chosen signal to the processing circuit.

8. A circuit system comprising:
a plurality of circuit blocks; and
a reset circuit which outputs a reset signal to each of the circuit blocks,
wherein each of the circuit blocks comprises:
a processing circuit which performs a data processing operation on input data; and
a reset adjustment circuit which maintains a reset state of the processing circuit for a time period when a reset signal that initializes the processing circuit is received,
wherein the reset adjustment circuit comprises a positive phase/negative phase selection circuit which determines whether the reset signal is to be received at a rising edge or a falling edge of a clock signal that is used to perform synchronization processing in the each of the circuit blocks.

9. The circuit system of claim 8, fun her comprising a memory which stores a value corresponding to the time period for each of the circuit blocks,
wherein the reset adjustment circuit maintains the reset state of the processing circuit according to the value stored in the memory.

10. The circuit system of claim 8, fun her comprising a clock circuit which outputs a clock signal to each of the circuit blocks.

11. The circuit system of claim 9, further comprising a control unit which reads the value from the memory and then inputs the value to the reset adjustment circuit of each of the circuit blocks.

12. The circuit system of claim 8, wherein the reset adjustment circuit sets the time period based on a time difference between when the reset signal is received and when the input data is received from a previous circuit block that precedes a corresponding circuit block.

13. The circuit system of claim 8, wherein the reset adjustment circuit resets the time period.

14. The circuit system of claim 8, wherein each of the circuit blocks further comprises an input timing adjustment circuit which adjusts an input timing of a plurality of data signals when the data signals are input to the processing circuit.

15. The circuit system of claim 14, wherein the input timing adjustment circuit comprises a positive phase/negative phase selection circuit which determines whether the data signals are to be received at a rising edge or a falling edge of a clock signal that is used to perform synchronization processing in a corresponding circuit block.

16. The circuit system of claim 15, further comprising:
a memory which stores selection information indicating whether the rising edge or the falling edge of the clock signal is to be selected by the positive phase/negative phase selection circuit; and
a control unit which reads the selection information from the memory and then inputs the selection information to the positive phase/negative phase selection circuit.

17. A skew compensation method comprising:
putting a processing circuit which performs a data processing operation into a reset state when a reset signal is received;
receiving a plurality of data signals; and
canceling the reset state of the processing circuit a time period after the reception of the reset signal,
wherein the canceling of the reset state is based on whether the reset signal is to be received at a rising edge or a falling edge of a clock signal that is used to perform synchronization processing in a circuit block comprising the processing circuit.

18. The skew compensation method of claim 17, further comprising adjusting the input timing of the data signals being input to the processing circuit.

* * * * *